(12) United States Patent
Torii et al.

(10) Patent No.: US 11,976,443 B2
(45) Date of Patent: May 7, 2024

(54) WORKING MACHINE

(71) Applicant: KUBOTA CORPORATION, Osaka (JP)

(72) Inventors: Yoshinori Torii, Osaka (JP); Yoichi Nishigori, Osaka (JP); Takahiko Nakaya, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 112 days.

(21) Appl. No.: 17/948,433

(22) Filed: Sep. 20, 2022

(65) Prior Publication Data

US 2023/0009082 A1 Jan. 12, 2023

Related U.S. Application Data

(63) Continuation of application No. PCT/JP2021/013367, filed on Mar. 29, 2021.

(30) Foreign Application Priority Data

Mar. 30, 2020 (JP) ................. 2020-060128

(51) Int. Cl.
*B60N 2/06* (2006.01)
*E02F 9/16* (2006.01)
(Continued)

(52) U.S. Cl.
CPC ............ *E02F 9/166* (2013.01); *E02F 9/2004* (2013.01); *B60N 2/06* (2013.01); *B60N 2/0705* (2013.01); *B60N 2/0745* (2013.01); *B60N 2/1832* (2013.01)

(58) Field of Classification Search
CPC ...... B60N 2/06; B60N 2/1832; B60N 2/0745; B60N 2/0705; E02F 9/166
See application file for complete search history.

(56) References Cited

U.S. PATENT DOCUMENTS 2,964,093 A * 12/1960 Lohr .................... B60N 2/0745
248/429
4,842,232 A * 6/1989 Pipon ................... B60N 2/1832
297/344.1
(Continued)

FOREIGN PATENT DOCUMENTS

GB  2 071 486 A  9/1981
JP  63-82841 A  4/1988
(Continued)

OTHER PUBLICATIONS

International Search Report and Written Opinion of the International Searching Authority issued in International Patent Application No. PCT/JP2021/013367, dated Jun. 15, 2021, along with an English translation thereof.

*Primary Examiner* — Syed A Islam

(74) *Attorney, Agent, or Firm* — GREENBLUM & BERNSTEIN, P.L.C.

(57) ABSTRACT

A working machine includes an operator's seat, a seat base supporting the operator's seat, and a slide rail for adjustment of a position of the operator's seat, the slide rail being located between the seat base and the operator's seat, in which the seat base includes a rail mount for attachment of the slide rail, the rail mount having a downward convex curve which is curved to deviate from the slide rail with increasing distance from each of opposite ends of the rail mount in a longitudinal direction of the slide rail and with decreasing distance to a center of the rail mount in the longitudinal direction.

8 Claims, 16 Drawing Sheets

(51) Int. Cl.
  *E02F 9/20*    (2006.01)
  *B60N 2/07*    (2006.01)
  *B60N 2/18*    (2006.01)

(56)          References Cited

U.S. PATENT DOCUMENTS

| | | | | |
|---|---|---|---|---|
| 5,224,391 | A * | 7/1993 | Schlechta | B60N 2/0745 |
| | | | | 74/411 |
| 5,350,148 | A * | 9/1994 | Yamamura | B60N 2/0705 |
| | | | | 248/420 |
| 7,334,829 | B2 * | 2/2008 | Fukui | B60N 2/0745 |
| | | | | 296/65.11 |
| 8,919,721 | B2 * | 12/2014 | Moriyama | B60N 2/0843 |
| | | | | 248/429 |
| 8,955,814 | B2 * | 2/2015 | Moriyama | B60N 2/0705 |
| | | | | 248/429 |
| 10,829,010 | B2 * | 11/2020 | Kapusky | F16C 29/048 |
| 2012/0061547 | A1 | 3/2012 | Moriyama et al. | |
| 2013/0020459 | A1 * | 1/2013 | Moriyama | B60N 2/0722 |
| | | | | 248/636 |
| 2014/0042789 | A1 * | 2/2014 | Kitaguchi | B60N 2/015 |
| | | | | 297/344.1 |
| 2014/0292045 | A1 * | 10/2014 | Jeffery | B60N 2/4221 |
| | | | | 297/216.1 |

FOREIGN PATENT DOCUMENTS

| | | |
|---|---|---|
| JP | 4-356237 A | 12/1992 |
| JP | 11-280117 A | 10/1999 |
| JP | 2012-61929 A | 3/2012 |
| JP | 2013-23039 A | 2/2013 |
| JP | 2013-230750 A | 11/2013 |

* cited by examiner

WORKING MACHINE

CROSS REFERENCE TO RELATED APPLICATIONS

This application is a continuation application of International Application No. PCT/JP2021/013367, filed on Mar. 29, 2021, which claims the benefit of priority to Japanese Patent Application No. 2020-060128, filed on Mar. 30, 2020. The entire contents of each of these applications are hereby incorporated herein by reference.

BACKGROUND OF THE INVENTION

1. Field of the Invention

The present invention relates to a working machine such as a backhoe.

2. Description of the Related Art

A working machine disclosed in Japanese Unexamined Patent Application Publication No. H11-280117 is known.

In the working machine disclosed in Japanese Unexamined Patent Application Publication No. H11-280117, slide rails for forward and rearward adjustment of the position of an operator's seat are provided between the operator's seat and a seat base supporting the operator's seat.

SUMMARY OF THE INVENTION

It is noted that a rail mount of the seat base, for attachment of a slide rail, may be curved upward to form an upward convex shape with increasing distance from the opposite ends of the rail mount in the front-rear direction of the slide rail and with decreasing distance to the center of the rail mount in the front-rear direction, depending on, for example, variations in parts machining accuracy. In such a case, the slide rail is pressed between the peak of the convex shape and a slide rail-mounting portion on the operator's seat side, and the slide rail undergoes so-called "twist" at some portions. Such twisted portions of the slide rail cause high sliding load, and rail segments of the slide rail do not slide well.

In view of the above issue, an object of the present invention is to reduce the sliding load on the slide rail.

A working machine according to an aspect of the present invention includes an operator's seat, a seat base supporting the operator's seat, and a slide rail for adjustment of a position of the operator's seat, the slide rail being located between the seat base and the operator's seat, and the seat base includes a rail mount for attachment of the slide rail, the rail mount having a downward convex curve which is curved to deviate from the slide rail with increasing distance from each of opposite ends of the rail mount in a longitudinal direction of the slide rail and with decreasing distance to a center of the rail mount in the longitudinal direction.

The slide rail may include an upper rail segment for direct or indirect attachment to the operator's seat and a lower rail segment for attachment to the rail mount. Opposite ends of the lower rail segment in the longitudinal direction may be attached to the rail mount, and there may be a first gap between the rail mount and an intermediate portion of the lower rail segment in the longitudinal direction.

The working machine may further include a movable body for attachment of the operator's seat. Opposite ends of the upper rail segment in the longitudinal direction may be attached to a lower surface of the movable body, and there may be a second gap between the lower surface and an intermediate portion of the upper rail segment in the longitudinal direction.

The seat base may include a top plate having a mounting hole. The rail mount may be formed of a thick plate for insertion into the mounting hole such that the thick plate protrudes upward from the top plate, and the thick plate having the downward convex curve imparted thereto may be welded to the top plate.

The thick plate of the rail mount may have, in an intermediate portion of the thick plate in the longitudinal direction, a through-hole for adjustment of the downward convex curve.

There may be a plurality of the slide rails including a first slide rail and a second slide rail, the first slide rail being located closer to one of opposite sides of the operator's seat than to the other of the opposite sides of the operator's seat, the second slide rail being located closer to the other of the opposite sides of the operator's seat than to the one of the opposite sides of the operator's seat and located substantially in parallel to the first slide rail.

The working machine may further include a movable body supported by the slide rail such that a position of the movable body relative to the seat base is adjustable, and another slide rail supporting the operator's seat such that the position of the operator's seat relative to the movable body is adjustable.

The working machine may further include a first console located on one of opposite sides of the operator's seat and attached to the movable body, and a second console located on the other of the opposite sides of the operator's seat and attached to the movable body.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

DETAILED DESCRIPTION OF THE PREFERRED EMBODIMENTS

Figure 1:
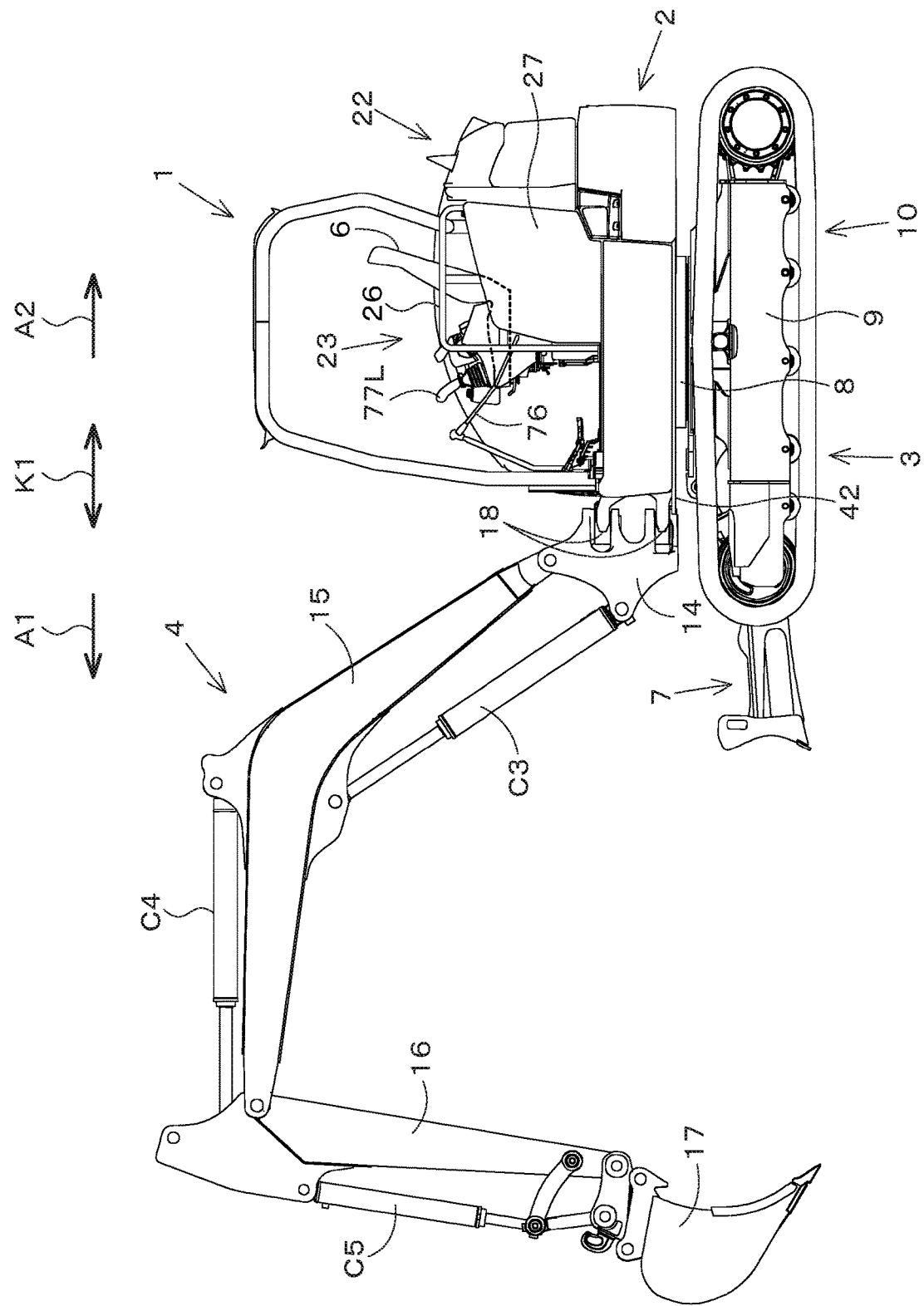
FIG. 1 is a side view of a working machine.

The preferred embodiments will now be described with reference to the accompanying drawings, wherein like reference numerals designate corresponding or identical elements throughout the various drawings. The drawings are to be viewed in an orientation in which the reference numerals are viewed correctly.

The following description discusses an embodiment of the present invention with reference to drawings as appropriate.

FIG. 1 is a side view schematically illustrating a general configuration of a working machine 1 according to the present embodiment. In the present embodiment, a backhoe, which is a revolving working machine, is illustrated as an example of the working machine 1.

As illustrated in FIG. 1, the working machine 1 includes a machine body (swiveling base) 2, a traveling device 3, and a working device 4. The machine body 2 is provided with an operator's seat 6 for an operator (driver).

In the present embodiment, a direction forward from the operator seated on the operator's seat 6 of the working machine 1 (direction of arrow A1 in FIG. 1) is referred to as a forward direction, a direction rearward from the operator (direction of arrow A2 in FIG. 1) is referred to as a rearward direction, and a direction of K1 in FIG. 1 is referred to as a front-rear direction. A direction leftward from the operator (direction to the near side in FIG. 1) is referred to as a leftward direction, and a direction rightward from the operator (direction to the far side in FIG. 1) is referred to as a rightward direction.

A horizontal direction orthogonal to the front-rear direction K1 is referred to as a machine body width direction. A direction rightward or leftward from the widthwise center of the machine body 2 (middle of the machine body 2 in the machine body width direction) is referred to as a machine body outward direction. That is, the machine body outward direction is a machine body width direction away from the widthwise center of the machine body 2. A direction opposite to the machine body outward direction is referred to as a machine body inward direction. That is, the machine body inward direction is a machine body width direction toward the widthwise center of the machine body 2.

As illustrated in FIG. 1, the traveling device 3 includes a traveling frame 9 and traveling mechanisms 10 provided on left and right portions of the traveling frame 9. The traveling mechanisms 10 are formed of crawler traveling mechanisms driven by a hydraulic motor. The traveling device 3 has attached to its front portion thereof a blade implement 7 which can be moved up and down by a hydraulic cylinder.

As illustrated in FIG. 1, the working device 4 is provided on a front portion of the machine body 2 and includes a boom 15, an arm 16, and a bucket (working tool) 17. The boom 15 has its proximal portion pivoted on a swing bracket 14 such that the boom 15 is pivotable about a horizontal axis (axis extending in the machine body width direction K2) (swingable up and down). The swing bracket 14 is supported on a support bracket 18 on the front portion of the machine body 2 such that the swing bracket 14 is pivotable about a vertical axis (axis extending in an up-and-down direction). The arm 16 is pivoted on a distal portion of the boom 15 such that the arm 16 is pivotable about a horizontal axis (swingable forward and rearward or up and down). The bucket 17 is provided on a distal portion of the arm 16 such that the bucket 17 is capable of shoveling and dumping. The working machine 1 can have attached thereto other working tools (hydraulic attachments) which can be driven by a hydraulic actuator, instead of or in addition to the bucket 17. Examples of the other working tools include hydraulic breakers, hydraulic crushers, angle brooms, earth augers, pallet forks, sweepers, mowers, and snow blowers.

The swing bracket 14 is caused to swing by extension or retraction of a hydraulic cylinder. The boom 15 is caused to swing by extension or retraction of a boom cylinder C3. The arm 16 is caused to swing by extension or retraction of an arm cylinder C4. The bucket 17 is caused to perform shoveling and dumping actions by extension or retraction of a bucket cylinder (working tool cylinder) C5. The boom cylinder C3, the arm cylinder C4, and the bucket cylinder C5 are each formed of a hydraulic cylinder (hydraulic actuator).

As illustrated in FIG. 1, the machine body 2 is supported on the traveling frame 9 (traveling device 3) via a swing bearing 8 such that the machine body 2 is rotatable about a vertical axis (swivelable leftward and rightward).

Figure 3:
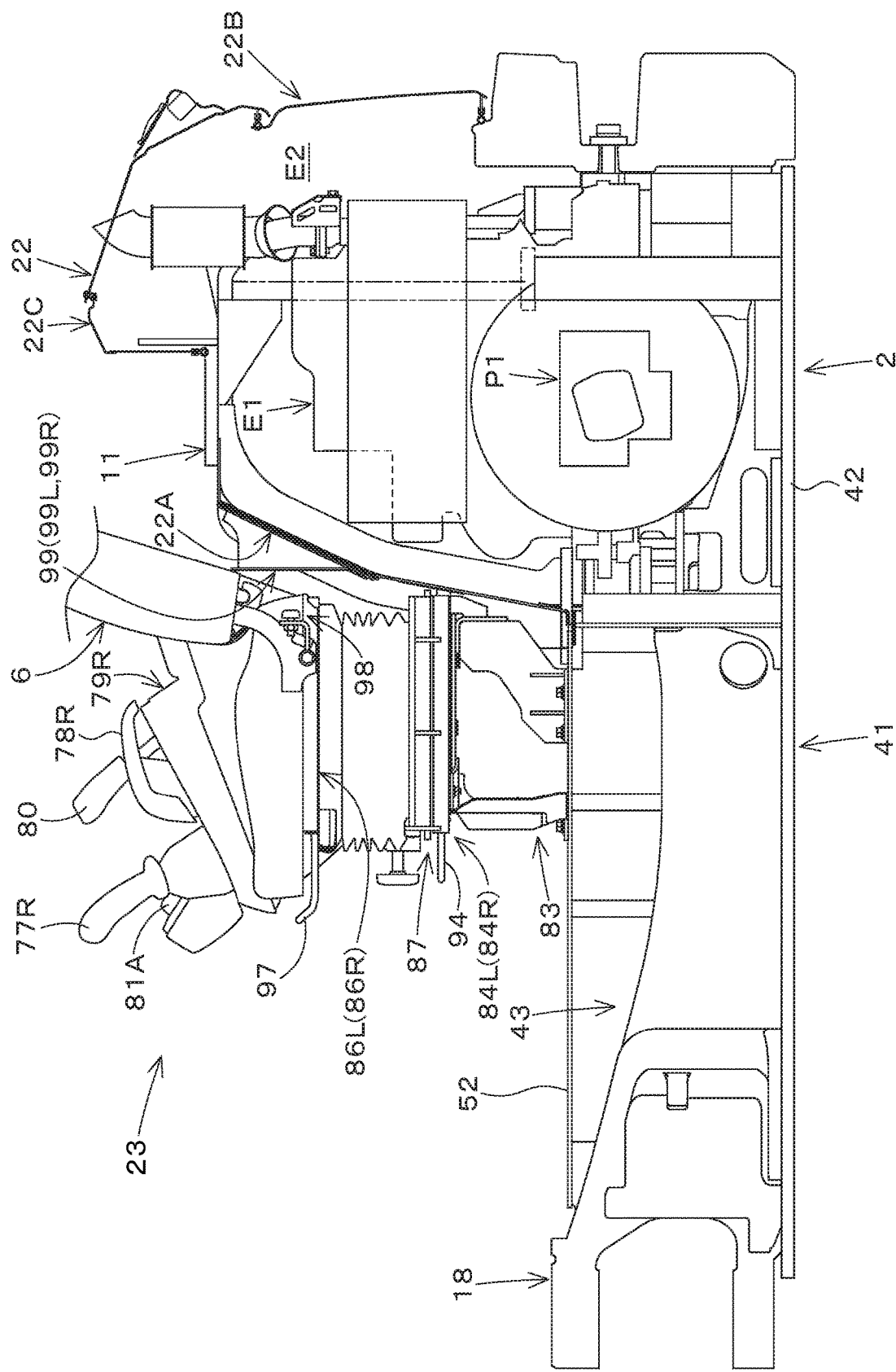
FIG. 3 is a side view illustrating the operator section and a prime mover attached on a machine body.

As illustrated in FIG. 3, the machine body 2 includes a swiveling frame 41 which serves as a framework of the machine body 2. The swiveling frame 41 includes a swiveling board 42 constituting the base of the machine body 2, and the swiveling board 42 has fixed thereon reinforcing rib(s) 43, the support bracket 18, and brackets and stays for attachment of devices (including tank(s) and/or the like) and other components for the machine body 2 and/or the like.

As illustrated in FIGS. 1 and 3, the machine body 2 includes an operator section 23 including the operator's seat 6. The operator section 23 is located between the center of the machine body 2 and one side (left side) of the machine body 2. As illustrated in FIG. 3, the machine body 2 is provided, at a front portion thereof, with a floor step 52 which constitutes a floor surface of the machine body 2 (floor surface of an upper portion of the machine body 2). The floor step 52 covers a left side of a front portion of the swiveling frame 41. The operator section 23 is provided at the rear of the floor step 52.

As illustrated in FIG. 3, a hood 22 which defines a prime mover chamber E2 to house a prime mover E1 is provided rearward of the operator section 23. The prime mover E1 is, for example, a diesel engine, and drives a hydraulic pump P1 to deliver hydraulic fluid (pressure oil) to drive hydraulic actuators such as hydraulic motor(s) and hydraulic cylinders of the working machine 1. Note that the prime mover E1 may be a gasoline engine or an electric motor, and may be a hybrid prime mover including an engine and an electric motor.

The hood 22 includes a partition (partition plate) 22A which covers the front of the prime mover E1 (covers the prime mover E1 diagonally from upward and forward), a hood's rear portion 22B which covers the prime mover E1 diagonally from upward and rearward and which is openable and closable, and a fixed hood 22C located forward of an upper portion of the hood's rear portion 22B. The hood 22 is provided, inside thereof, with a support frame 11 to support the hood 22. The support frame 11 extends upward from the machine body 2 (swiveling frame 41). The partition 22A separates the prime mover chamber E2 from an area located diagonally upward and forward of the prime mover chamber E2. The operator's seat 6 is located forward of the partition 22A. That is, the partition 22A separates the prime mover chamber E2 from an area in which the operator's seat 6 is located (separates the prime mover chamber E2 from the area on the same side of the prime mover chamber E2 as the operator's seat 6).

Figure 2:
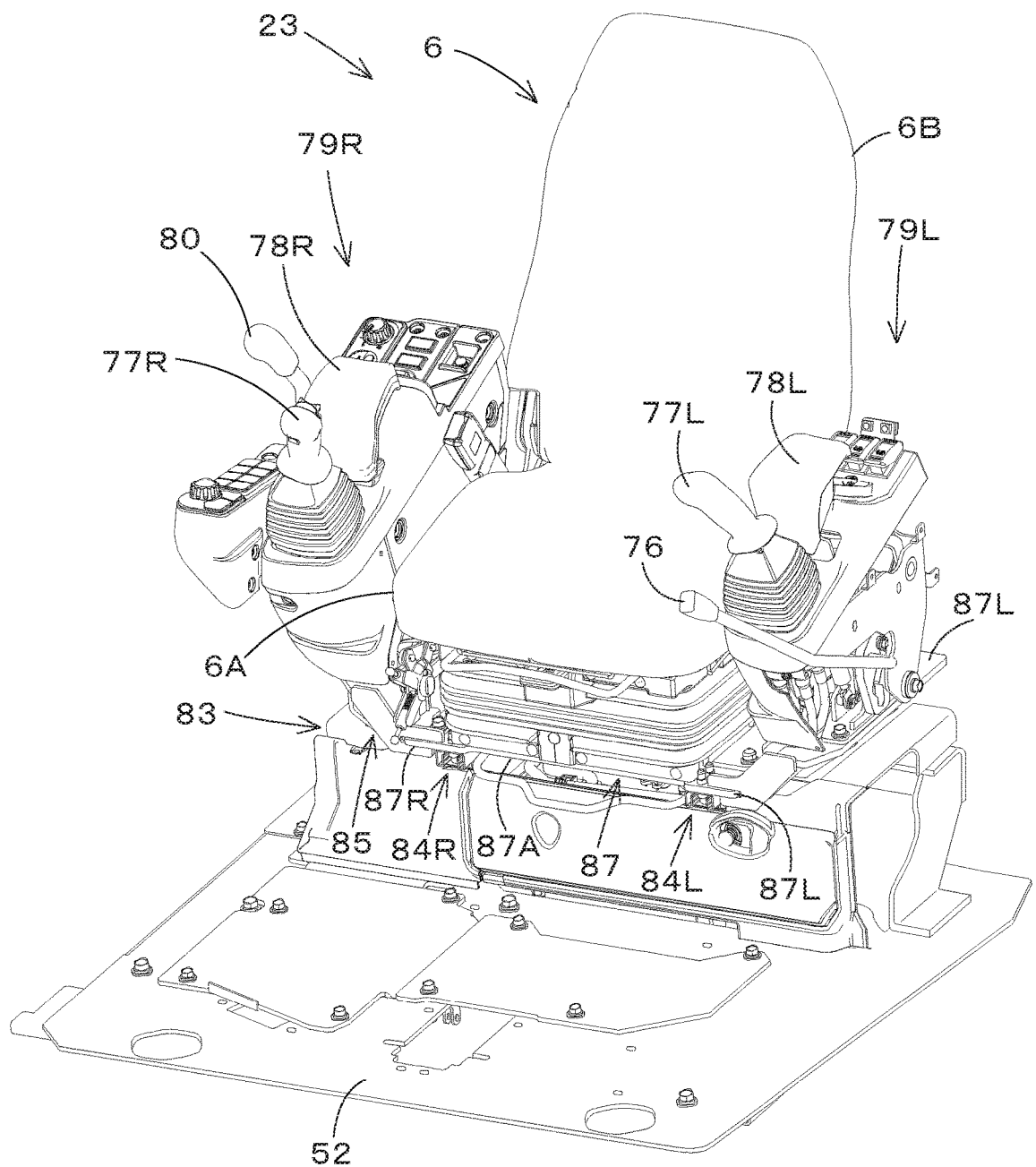
FIG. 2 is a perspective view of an operator section.

As illustrated in FIG. 2, the operator section 23 includes a left console (first console) 79L located on one of opposite sides (left side) of the operator's seat 6 and a right console (second console) 79R located on the other of the opposite sides (right side) of the operator's seat 6. The first console 79L includes an unloading lever 76, a left operating lever (first manual operator) 77L, a left armrest 78L, and/or the like. The second console 79R includes a right operating lever (second manual operator) 77R, a right armrest 78R, and a blade lever (lever member) 80. The operator's seat 6 includes a seat 6A to support the bottom of an operator and a backrest 6B to support the back of the operator.

The unloading lever 76 switches between a state in which hydraulic fluid is allowed to be supplied to hydraulic devices (such as, for example, hydraulic cylinder(s) to drive the working device 4 and/or a swivel motor to cause the machine body 2 to swivel) and a state in which the hydraulic fluid is not allowed to be supplied to the hydraulic devices.

The operating lever 77L can be used to operate two objects. For example, the operating lever 77L can be used to operate the machine body 2 to swivel and operate the arm 16 to swing. The operating lever 77R can also be used to operate two objects. For example, the operating lever 77R can be used to operate the boom 15 to swing and operate the bucket 17 to swing.

The blade lever 80 is used to operate the blade implement 7.

As illustrated in FIG. 1, a handrail 26 and an exterior cover 27 are provided on one side (left side) of the operator section 23.

Figure 4:
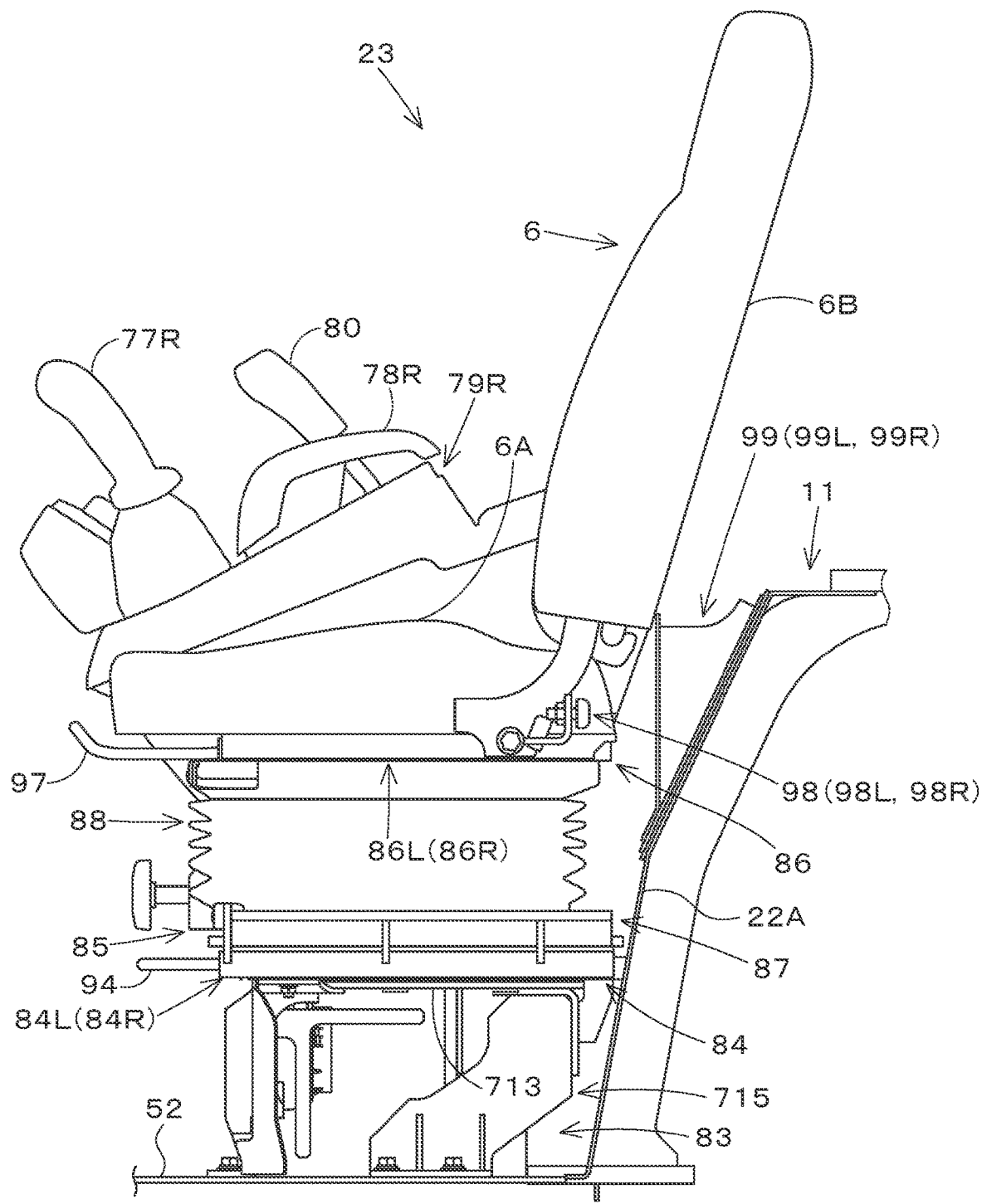
FIG. 4 is a side view of the operator section.
Figure 5:
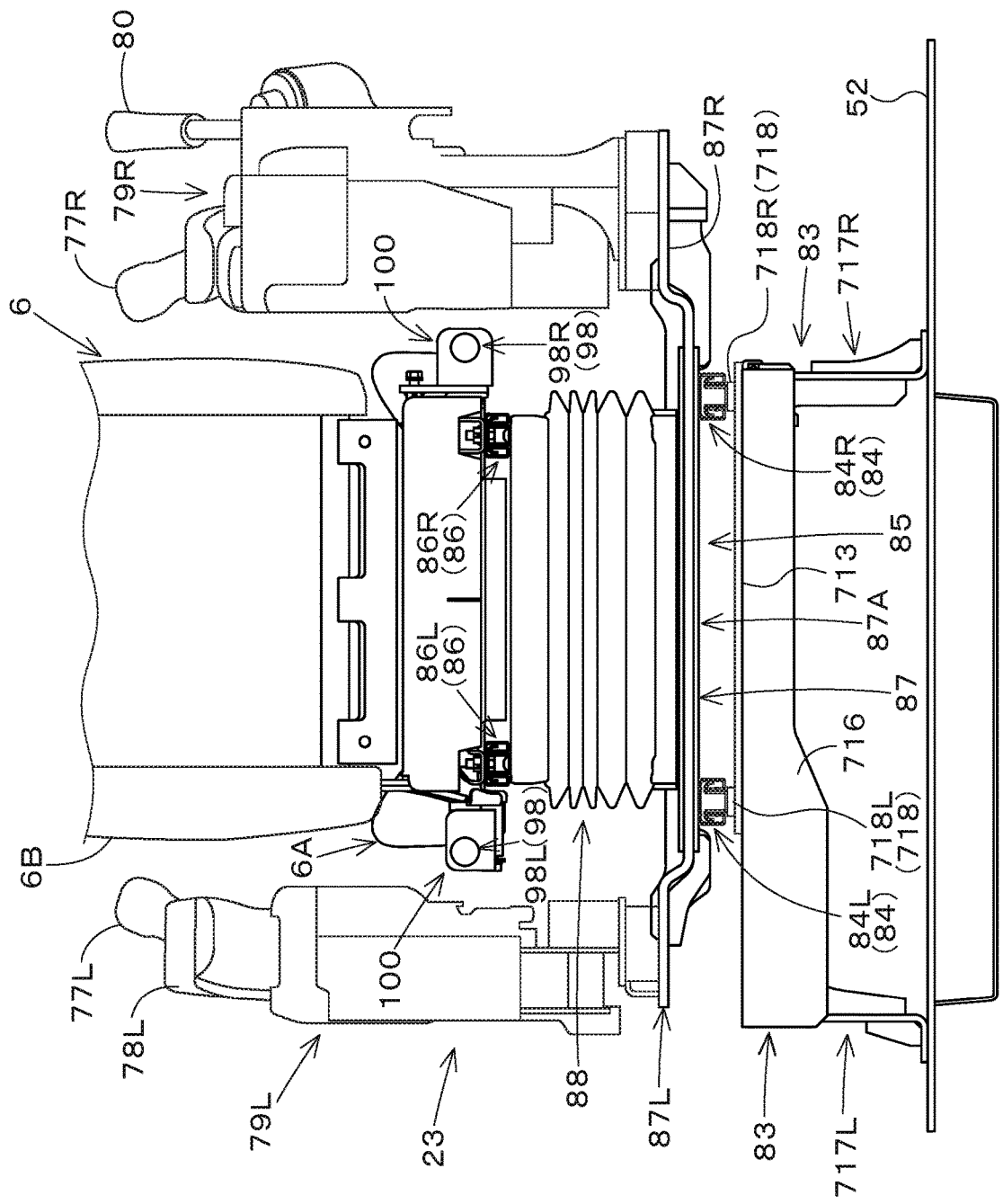
FIG. 5 is a rear view of the operator section.

As illustrated in FIGS. 4 and 5, a seat base 83 is provided below the operator's seat 6. The seat base 83 is attached to the floor step 52 (machine body 2). The seat base 83 has, supported thereon via a first rail system (rail system) 84, a movable body 85 such that the position of the movable body 85 is adjustable (the position is adjustable forward and rearward). The first rail system 84 includes slide rails 84L and 84R. The slide rails 84L and 84R include a first slide rail (left slide rail) 84L located closer to one of the opposite sides (left side) of the operator's seat 6 than to the other of the opposite sides and a second slide rail (right slide rail) 84R located closer to the other of the opposite sides (right side) of the operator's seat 6 than to the one of the opposite sides and located substantially in parallel to the first slide rail 84L. The movable body 85 has attached thereto the first console 79L and the second console 79R.

The operator's seat 6 is provided on the movable body 85. Specifically, the operator's seat 6 is provided on the movable body 85 with a second rail system (another rail system) 86 therebetween such that the position of the operator's seat 6 is adjustable (the position is adjustable forward and rearward). The second rail system 86 includes slide rails (another slide rails) 86L and 86R. The slide rails 86L and 86R include a third slide rail 86L located closer to one of the opposite sides (left side) of the operator's seat 6 than to the other of the opposite sides and a fourth slide rail 86R located closer to the other of the opposite sides (right side) of the operator's seat 6 than to the one of the opposite sides and located substantially in parallel to the third slide rail 86L. The operator's seat 6, together with the movable body 85, is adjustable in position forward and rearward with the first rail system 84. That is, the first rail system 84 supports the operator's seat 6 via the movable body 85 such that the position of the operator's seat 6 is adjustable forward and rearward.

The movable body 85 includes a slide frame 87 attached to the seat base 83 via the first slide rail 84L and the second slide rail 84R, and a suspension (support) 88 attached on the slide frame 87.

Figure 6:
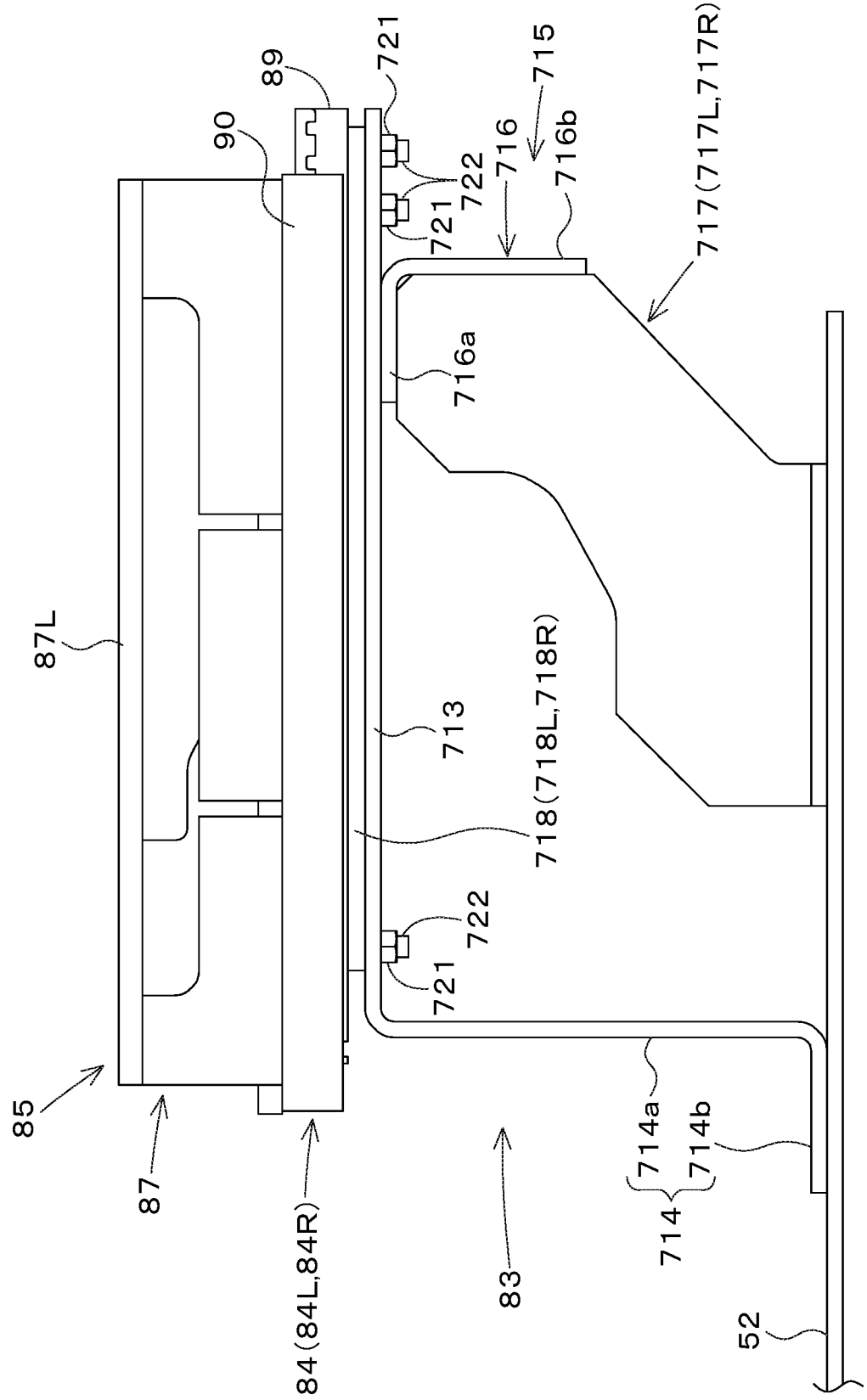
FIG. 6 is a side view of a seat base.
Figure 7:
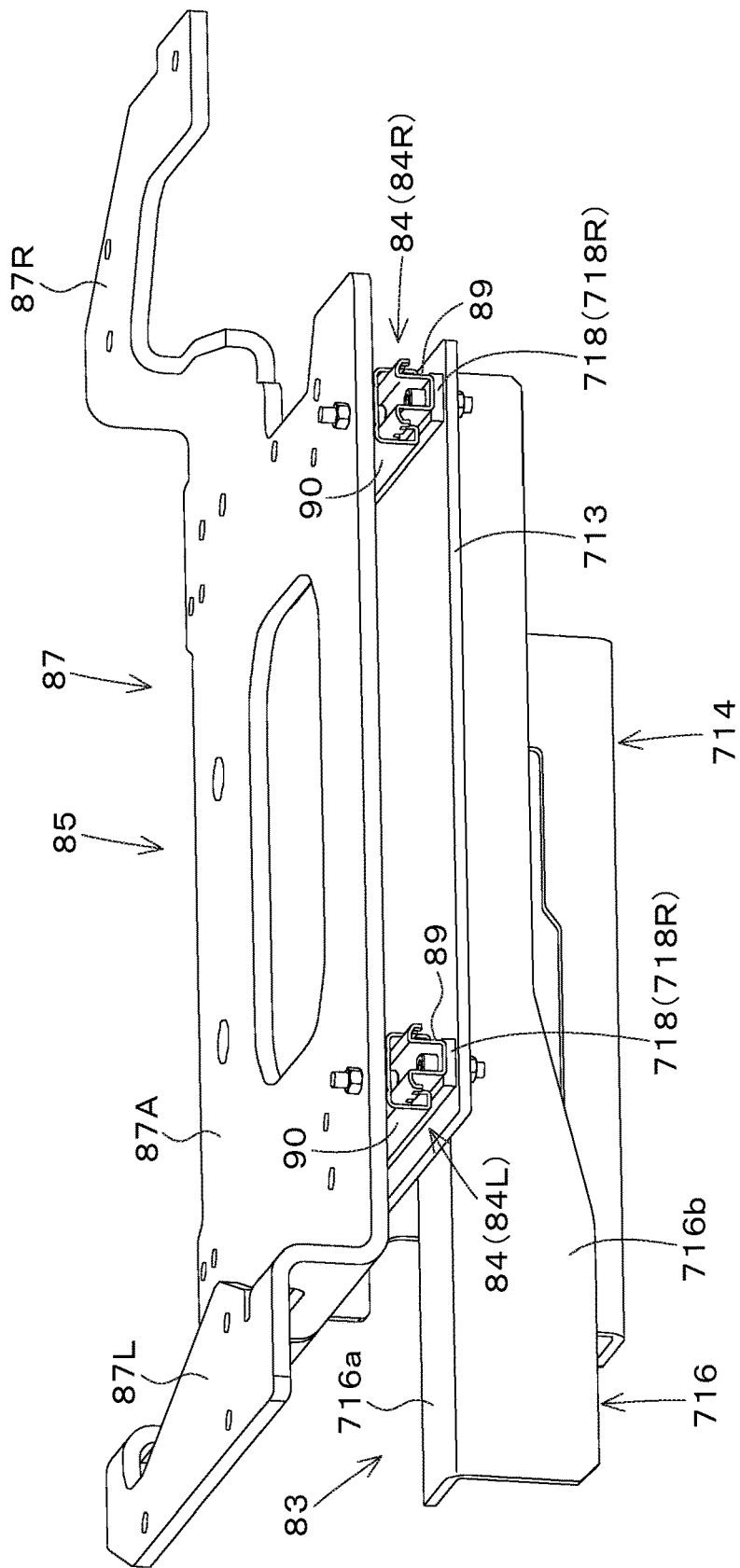
FIG. 7 illustrates an assembly of the seat base and a slide frame.

As illustrated in FIGS. 6 and 7, the slide frame 87 includes a first attachment portion (main attachment portion) 87A for attachment of the suspension 88, a second attachment portion (another attachment portion) 87L extending leftward from the first attachment portion 87A, and a third attachment portion (one attachment portion) 87R extending rightward from the first attachment portion 87A. The first console 79L is attached to the second attachment portion 87L, and the second console 79R is attached to the third attachment portion 87R.

As illustrated in FIGS. 4 and 5, the operator's seat 6 is attached to the suspension 88 via the third slide rail 86L and the fourth slide rail 86R such that the position of the operator's seat 6 is adjustable forward and rearward. The suspension 88 is a shock absorber which supports the weight of the operator on the operator's seat 6 and which suppresses vibrations and impact transferring to the operator's seat 6 from below. The suspension 88 may include a height adjustment mechanism to adjust the height of the operator's seat 6.

As illustrated in FIG. 4, at least one stopper 98 is provided at the rear of the operator's seat 6. At least one abutment member 99 is located rearward of the stopper 98. The abutment member 99 is provided above the partition 22A. The abutment of the stopper 98 on the abutment member 99 makes it possible to restrict the movement of the operator's seat 6 in the rearward direction before the operator's seat 6 contacts the partition 22A. The stopper 98 is attached to the operator's seat 6 such that the position of the stopper 98 is adjustable in the front-rear direction K1.

As illustrated in FIG. 5, the at least one stopper 98 includes a first stopper 98L provided leftward of a rear portion of the seat part 6A and a second stopper 98R provided rightward of the rear portion of the seat part 6A. The at least one abutment member 99 includes a first abutment member 99L located rearward of the first stopper 98L and a second abutment member 99R located rearward of the second stopper 98R.

As illustrated in FIGS. 6 and 7, the seat base 83 includes a top plate 713, a front support leg 714 which supports a front portion of the top plate 713, and a rear support leg 715 which supports a rear portion of the top plate 713. The top plate 713 is located below the operator's seat 6 and the movable body 85 and above the floor step 52 with its surfaces facing up and down. The front support leg 714 includes a front wall portion 714a which extends downward from the front edge of the top plate 713, and an attachment wall portion 714b which extends forward from the lower edge of the front wall portion 714a and which is placed on and attached to the floor step 52.

As illustrated in FIGS. 6 and 7, the rear support leg 715 includes a support plate 716 fixed on a rear portion of the top plate 713, and at least one leg part 717 fixed on the support plate 716 and attached to the floor step 52. The support plate 716 is fixed to the lower surface of the top plate 713. Specifically, the support plate 716 includes an upper wall 716a welded to the lower surface of a rear portion of the top plate 713, and a rear wall 716b which extends downward from the rear edge of the upper wall 716a. The support plate 716 extends over the top plate 713 in the machine body width direction K2 and projects leftward from the top plate 713. The at least one leg part 717 includes a first leg part 717L fixed to a left portion of the support plate 716 and a second leg part 717R fixed to a right portion of the support plate 716. The first leg part 717L and the second leg part 717R are placed on and attached to the floor step 52.

Figure 8:
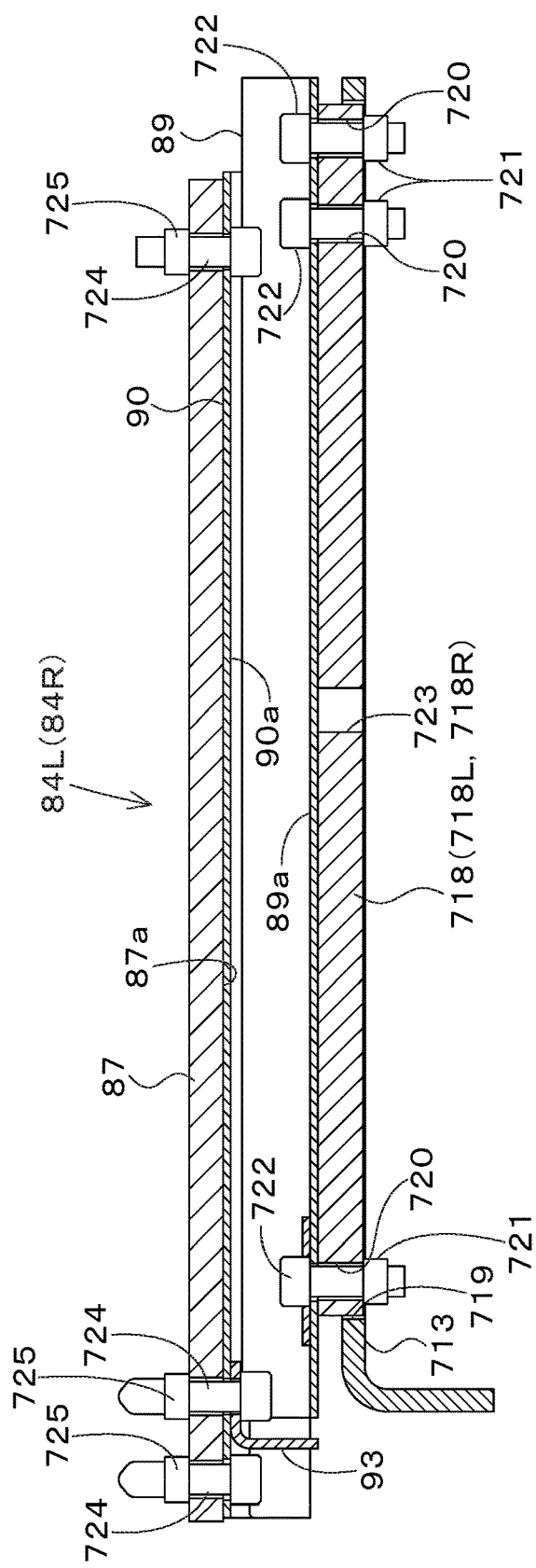
FIG. 8 is a side cross-sectional view of a slide rail attached to a rail mount and to the slide frame.
Figure 9:
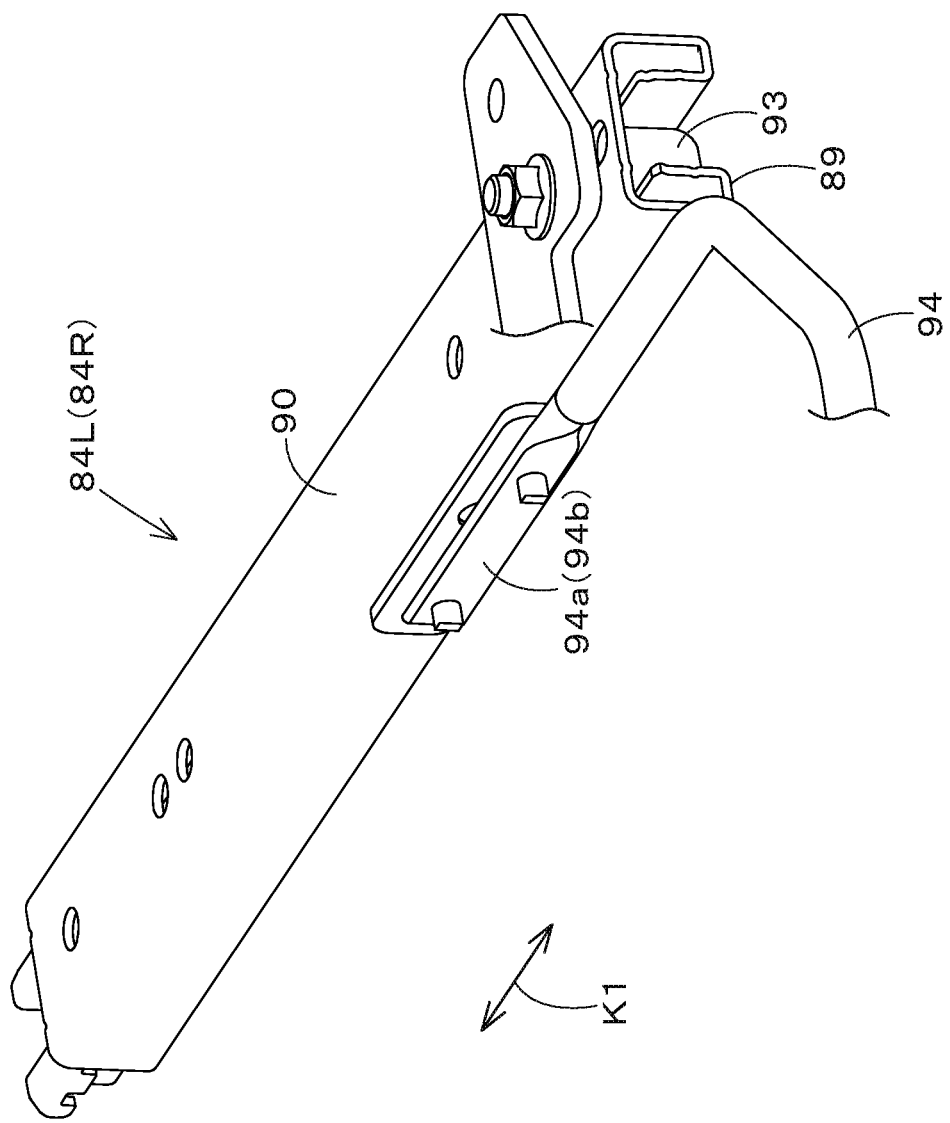
FIG. 9 is a perspective view of a first slide rail (a second slide rail).

As illustrated in FIGS. 8 and 9, the first slide rail 84L and the second slide rail 84R are each elongated in the front-rear direction K1. Specifically, the first slide rail 84L and the second slide rail 84R are arranged such that the longitudinal direction thereof matches the front-rear direction K1. The first slide rail 84L and the second slide rail 84R each include a lower rail segment 89 and an upper rail segment 90.

As illustrated in FIGS. 6 and 7, the lower rail segment 89 is attached to the seat base 83. The upper rail segment 90 is fitted on the lower rail segment 89 such that the upper rail segment 90 is movable in the front-rear direction K1, and is attached to the slide frame 87. This allows the movable body 85 to move in the front-rear direction K1 relative to the seat base 83.

As illustrated in FIG. 8, the upper rail segment 90 has, attached to its front portion, a restricting member 93 which abuts on the front end of the lower rail segment 89 to restrict the rearward movement of the upper rail segment 90 relative to the lower rail segment 89.

Figure 10:
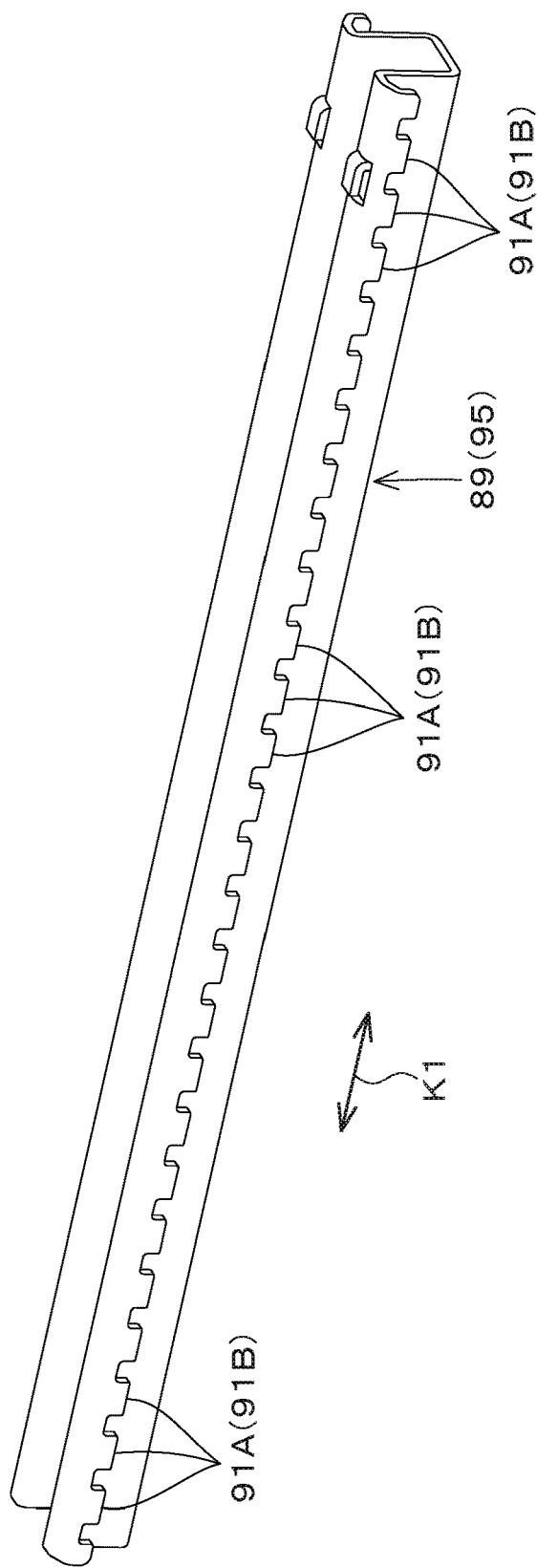
FIG. 10 is a perspective view of a lower rail segment.
Figure 11:
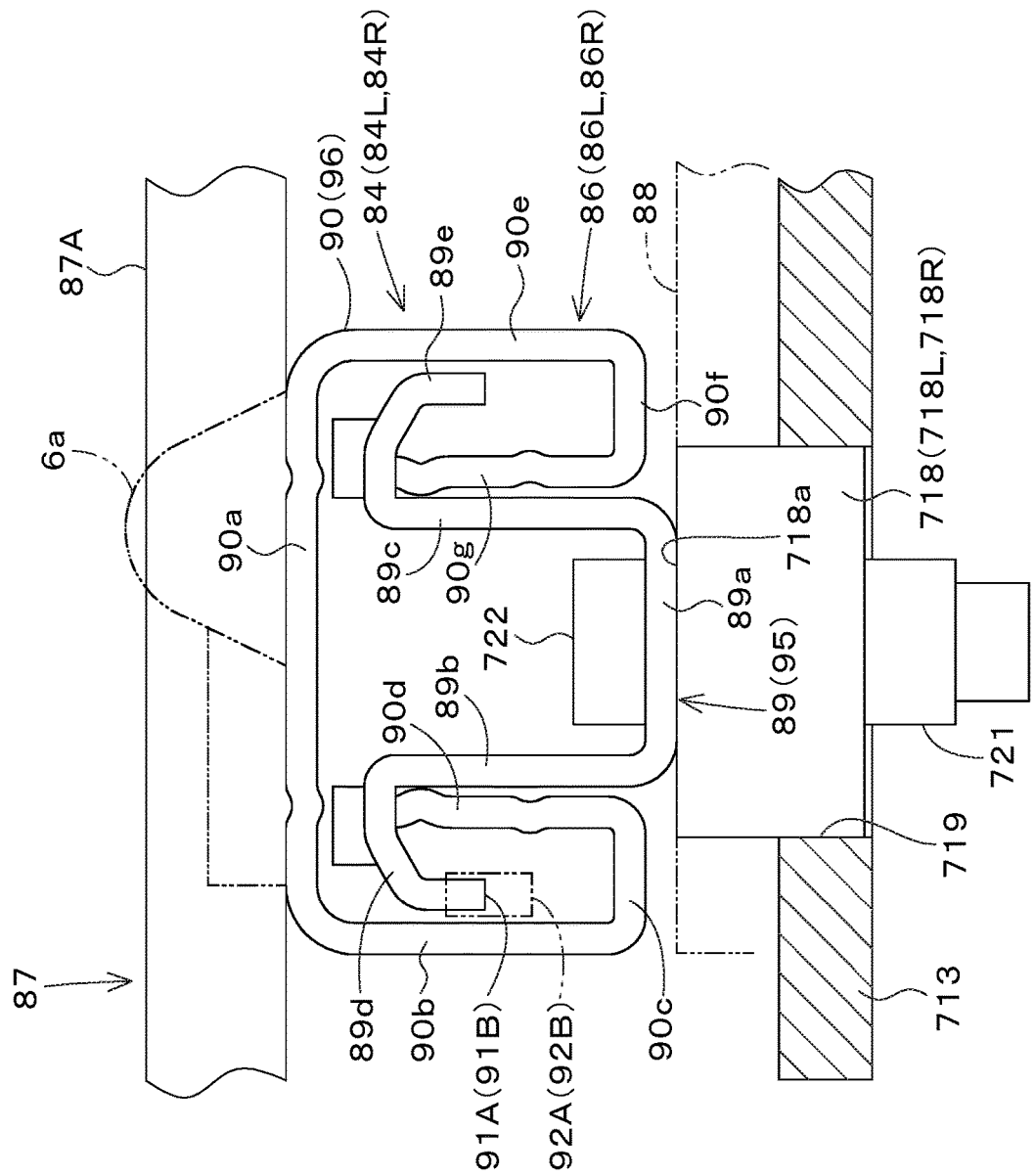
FIG. 11 is a rear cross-sectional view of a portion in which the slide rail is attached.

As illustrated in FIG. 10, the lower rail segment 89 includes multiple engagement portions 91A which are arranged at intervals in the front-rear direction K1 from the front to the rear of the lower rail segment 89. As illustrated in FIG. 11, the upper rail segment 90 is provided, inside thereof, with an engagement member 92A that engages the engagement portions 91A. When the engagement member 92A is in engagement with the engagement portions 91A, the forward and rearward movements of the upper rail segment 90 relative to the lower rail segment 89 are restricted (the first slide rail 84L and the second slide rail 84R are locked).

As illustrated in FIG. 9, an operating rod 94 is attached to the upper rail segment 90. The operating rod 94 has one end portion 94a attached to the upper rail segment 90 of the first slide rail 84L, and has the opposite end portion 94b attached to the upper rail segment 90 of the second slide rail 84R. The operating rod 94 is interlocked with the engagement member 92A. Raising the operating rod 94 causes the engagement member 92A to move away from the engagement portions 91A. This allows the upper rail segment 90 to be movable in the front-rear direction relative to the lower rail segment 89. When the force to move the operating rod 94 is released, the operating rod 94 is lowered by the biasing force of a spring, bringing the engagement member 92A into engagement with the engagement portions 91A.

Figure 12:
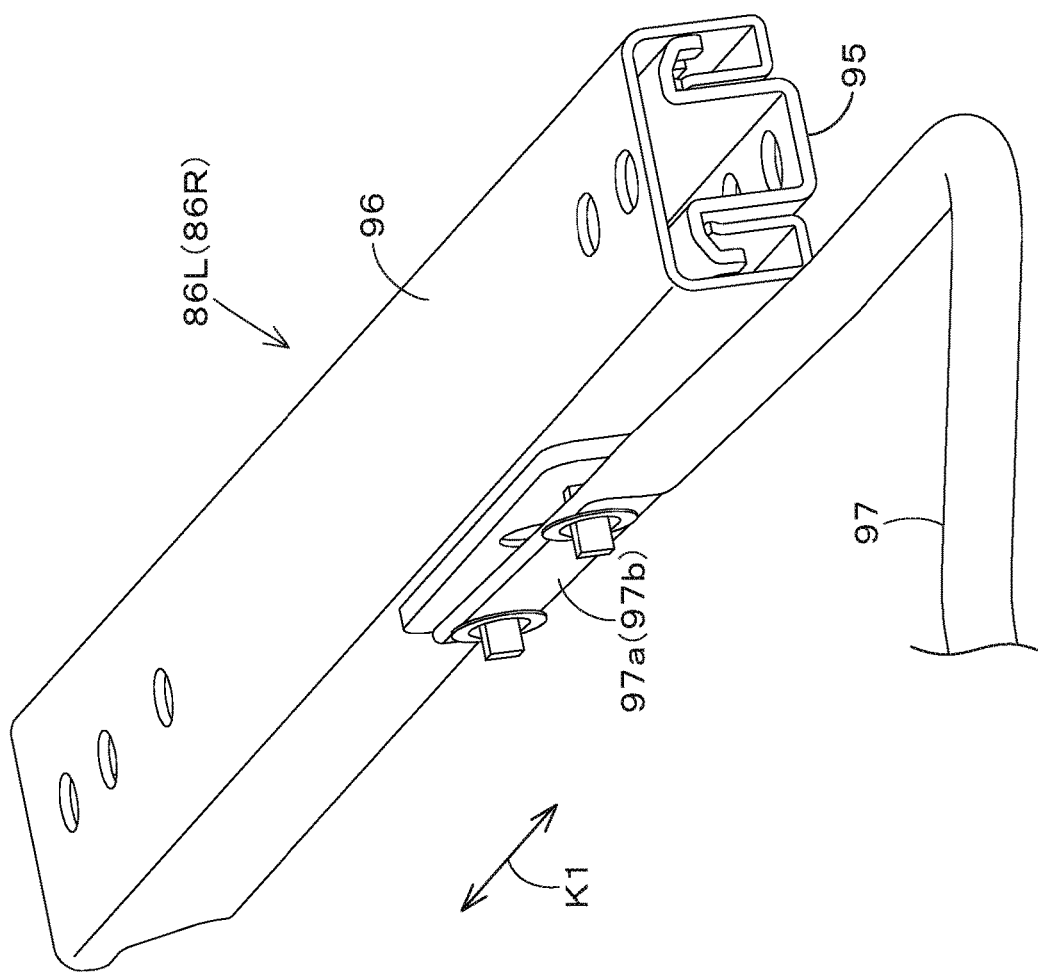
FIG. 12 is a perspective view of a third slide rail (a fourth slide rail).

As illustrated in FIG. 12, the third slide rail 86L and the fourth slide rail 86R are each elongated in the front-rear direction K1, and each include a lower rail segment 95 and an upper rail segment 96.

As illustrated in FIG. 11, the lower rail segment 95 is attached to the suspension 88. The upper rail segment 96 is fitted on the lower rail segment 95 such that the upper rail segment 96 is movable in the front-rear direction K1, and is attached to a bracket member 6a fixed to the operator's seat 6. This allows the operator's seat 6 to be movable in the front-rear direction K1 relative to the movable body 85.

As illustrated in FIG. 10, the lower rail segment 95 includes multiple engagement portions 91B which are arranged at intervals in the front-rear direction K1 from the front to the rear of the lower rail segment 95. As illustrated in FIG. 11, the upper rail segment 96 is provided, inside thereof, with an engagement member 92B that engages the engagement portions 91B. When the engagement member 92B is in engagement with the engagement portions 91B, the forward and rearward movements of the upper rail segment 96 relative to the lower rail segment 95 are restricted (the third slide rail 86L and the fourth slide rail 86R are locked).

As illustrated in FIG. 12, an operating rod 97 is attached to the upper rail segment 96. The operating rod 97 has one end portion 97a attached to the upper rail segment 96 of the third slide rail 86L, and has the opposite end portion 97b attached to the upper rail segment 96 of the fourth slide rail 86R. The operating rod 97 is interlocked with the engagement member 92B. Raising the operating rod 97 causes the engagement member 92B to move away from the engagement portions 91B. This allows the upper rail segment 96 to be movable in the front-rear direction relative to the lower rail segment 95. When the force to move the operating rod 97 is released, the operating rod 97 is lowered by the biasing force of a spring, bringing the engagement member 92B into engagement with the engagement portions 91B.

As illustrated in FIGS. 6 and 7, the seat base 83 includes at least one rail mount 718 provided on the top plate 713. The rail mount 718 has attached thereto a corresponding lower rail segment 89 of the first rail system 84.

As illustrated in FIG. 5, the at least one rail mount 718 includes a first rail mount 718L for attachment of the first slide rail 84L and a second rail mount 718R for attachment of the second slide rail 84R.

Figure 13:
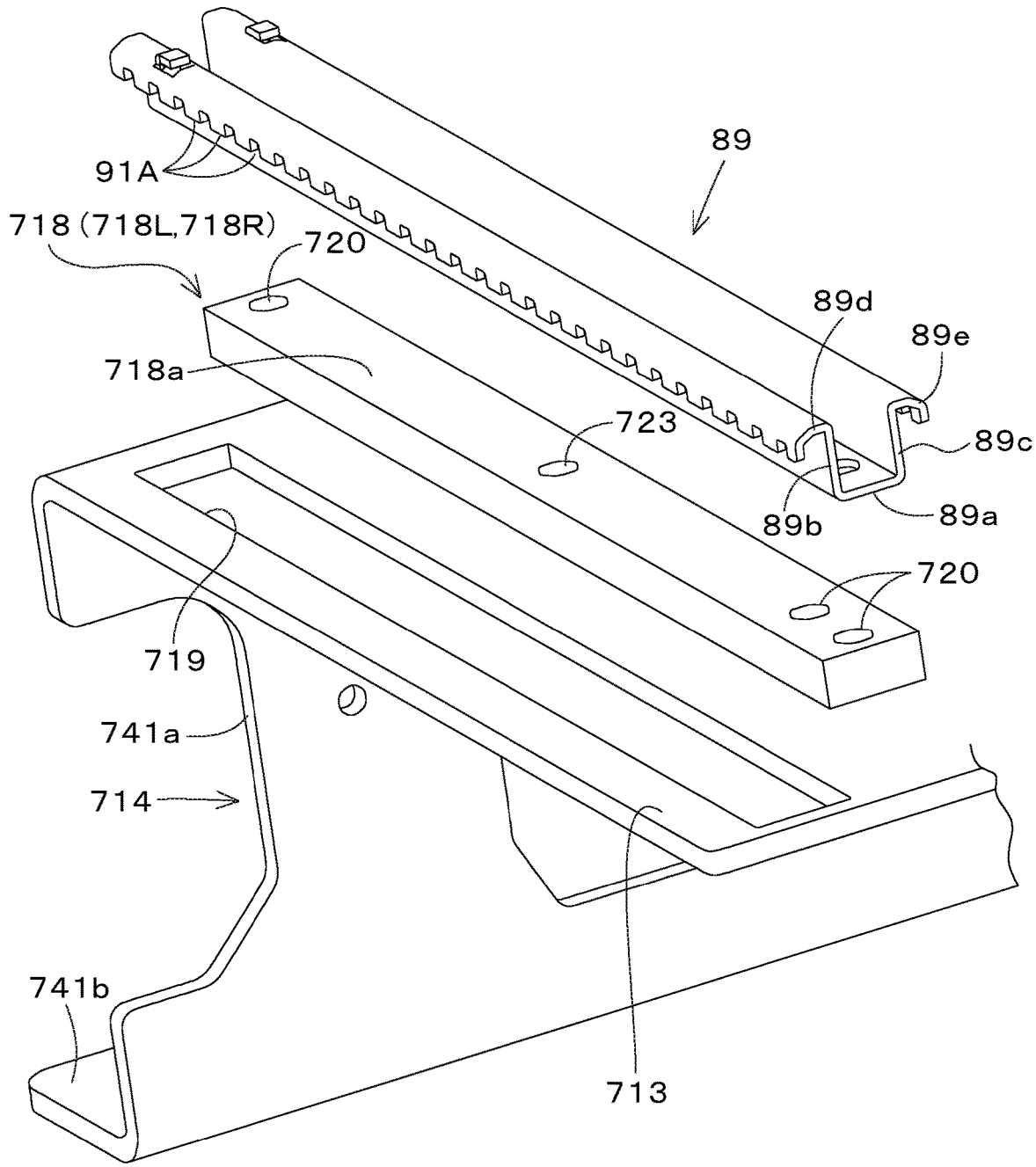
FIG. 13 is an exploded perspective view of a portion in which the lower rail segment is attached.

As illustrated in FIGS. 8 and 13, each rail mount 718 is formed of a rectangular thick plate (flat bar) elongated in the front-rear direction K1. The longitudinal direction of the rail mount 718 matches the longitudinal direction of the rails. The top plate 713 has, in a portion for placement of the rail mount 718, a mounting hole 719 which passes through the top plate 713 in the up-and-down direction. The mounting hole 719 is substantially the same in shape as the rail mount 718 in plan view, and can have the rail mount 718 inserted therein. The mounting hole 719 extends from a front end portion to a rear end portion of the top plate 713. As illustrated in FIG. 7, the support plate 716 (upper wall 716a) is fixed to the lower surface of the top plate 713 such that the support plate 716 intersects the mounting hole 719 in plan view. Since the support plate 716 is fixed to the lower surface of the top plate 713 such that the support plate 716 intersects the mounting hole 719, the mounting hole 719 can be formed such that the mounting hole 719 extends to the vicinity of the rear end of the top plate 713.

As illustrated in FIG. 11, the rail mount 718 is thicker than the top plate 713. In the present embodiment, the rail mount 718 is substantially twice as thick as the top plate 713. The rail mount 718 has its lower half inserted in the mounting hole 719 to reach the vicinity of the lower surface of the top plate 713. The lower surface of the rail mount 718 is located slightly higher than the lower surface of the top plate 713. Since the lower surface of the rail mount 718 is located higher than the lower surface of the top plate 713, the support plate 716 can be brought into surface contact with the lower surface of the top plate 713. The rail mount 718 has an upper half thereof protruding upward from the top plate 713. The rail mount 718 is welded to the top plate 713. The welded portions are present in a dotted manner around the rail mount 718 (along the edge of the mounting hole 719). Since a structure in which the rail mount 718 inserted in the mounting hole 719 is welded to the top plate 713 is used, a material thicker than the top plate 713 can be used to make the rail mount 718, making it possible to achieve sufficient strength to support heavy objects such as the operator's seat 6 and the movable body 85.

As illustrated in FIG. 13, each rail mount 718 has insertion holes 720, passing through the rail mount 718 in the up-and-down direction, in opposite end portions (the front portion and the rear portion) of the rail mount 718 in the longitudinal direction. As illustrated in FIG. 8, mounting nuts 721 to attach the lower rail segment 89 are fixed to portions of the lower surface of the rail mount 718 that correspond to the respective insertion holes 720. The rail mount 718 has a through-hole 723, passing through the rail mount 718 in the up-and-down direction, in an intermediate portion (substantially middle) of the rail mount 718 in the longitudinal direction.

As illustrated in FIG. 11, each lower rail segment 89 includes a bottom wall 89a, one side wall 89b extending upward from one of opposite edges of the bottom wall 89a that is located outward of the other in the machine body outward direction, an opposite side wall 89c extending upward from one of the opposite edges of the bottom wall 89a located inward of the other in the machine body inward direction, one extension wall 89d extending in the machine body outward direction from the upper edge of the one side wall 89b, and an opposite extension wall 89e extending in the machine body inward direction from the upper edge of the opposite side wall 89c. The one extension wall 89d and the opposite extension wall 89e include the engagement portions 91A. The upper rail segment 90 includes an upper wall 90a, a first side wall 90b extending downward from one of the opposite edges of the upper wall 90a that is located outward of the other in the machine body outward direction, a first extension wall 90c extending in the machine body inward direction from the lower edge of the first side wall 90b, a first upward extending wall 90d extending upward from one of the opposite edges of the first extension wall 90c that is located inward of the other in the machine body inward direction and abutting on the one extension wall 89d, a second side wall 90e extending downward from one of the opposite edges of the upper wall 90a that is located inward of the other in the machine body inward direction, a second extension wall 90f extending in the machine body outward direction from the lower edge of the second side wall 90e, and a second upward extending wall 90g extending upward from one of the opposite edges of the second extension wall 90f that is located outward of the other in the machine body outward direction and abutting on the opposite extension wall 89e.

As illustrated in FIG. 8, each lower rail segment 89 is placed on an upper surface (rail mount surface) 718a of a corresponding rail mount 718, and opposite end portions (the front portion and the rear portion) of the lower rail segment 89 in the longitudinal direction are attached using mounting bolts 722. Specifically, the lower rail segment 89 is attached to the rail mount 718 in a manner such that the mounting bolts 722 are inserted through the bottom wall 89a and the insertion holes 720 from above and screwed into the mounting nuts 721. In the present embodiment, the lower rail segment 89 is fixed to the rail mount 718 with the mounting bolts 722 and the mounting nuts 721 at one position in the front portion and at two positions in the rear portion. Each mounting bolt 722 and a corresponding mounting nut 721 constitute a fastener to fix the lower rail segment 89 to the rail mount 718.

As illustrated in FIG. 8, each upper rail segment 90 is attached to a lower surface 87a of the slide frame 87 (lower surface of the movable body 85). Opposite end portions (the front portion and the rear portion) of the upper rail segment 90 in the longitudinal direction are attached to the slide frame 87 using mounting bolts 724 and mounting nuts 725. Specifically, the mounting nuts 725 are fixed to positions of the upper surface of the slide frame 87 that correspond to the front and rear portions of the upper rail segment 90. The mounting bolts 724 are screwed into the mounting nuts 725 through the upper wall 90a of the upper rail segment 90 and the slide frame 87. In the present embodiment, the upper rail segment 90 is fixed to the slide frame 87 with the mounting bolts 724 and the mounting nuts 725 at two positions in the front portion and at one position in the rear portion. Each mounting bolt 724 and a corresponding mounting nut 725 constitute a fastener to attach the upper rail segment 90 to the slide frame 87 (movable body 85).

Figure 14:
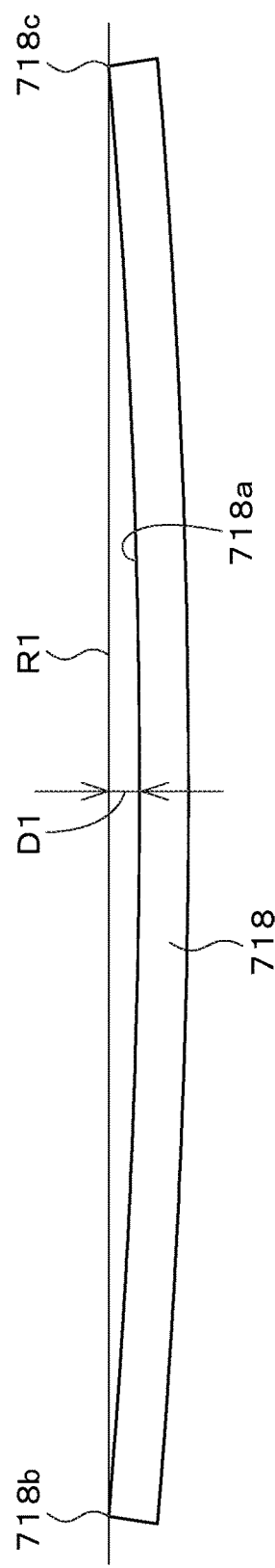
FIG. 14 is a graphical overview of the rail mount fixed to a top plate as seen from side.

FIG. 14 is a graphical overview of one of the rail mounts 718 fixed to the top plate 713 as seen from side.

As illustrated in FIG. 14, the rail mount 718 has a "downward convex curve D1". The downward convex curve D1 is curved to deviate from the slide rail (the first slide rail 84L or the second slide rail 84R) (curved downward) with increasing distance from each of opposite ends 718b and 718c of the rail mount 718 in the longitudinal direction (longitudinal direction of the first slide rail 84L or the second slide rail 84R) and with decreasing distance to the center of the rail mount 718 in the longitudinal direction.

In the present embodiment, the amount of the "downward convex curve D1" is, for example, 0.1 mm to 1 mm, preferably 0.5 mm to 1 mm. The amount of the "downward convex curve D1" is, as illustrated in FIG. 14, the maximum distance between a straight line R1 connecting the upper edges of the opposite end portions 718b and 718c of the rail mount 718 in the longitudinal direction and the upper surface (mount surface) 718a of the rail mount 718.

The downward convex curve D1 is imparted to the rail mount 718 when the rail mount 718 is welded to the top plate 713. The rail mount 718 having the downward convex curve D1 is fixed to the top plate 713. Specifically, first, the rail mount 718 inserted in the mounting hole 719 is held by a jig at the opposite ends 718b and 718c in the longitudinal direction. Next, with the opposite ends of the rail mount 718 held by the jig, a downward force is applied to the longitudinal center of the rail mount 718 to impart the downward convex curve D1 to the rail mount 718. Then, the rail mount 718 having the downward convex curve D1 is welded to the top plate 713. The downward force can be applied to the longitudinal center of the rail mount 718 by a method of pressing the longitudinal center of the rail mount 718 or a method of pulling down the longitudinal center of the rail mount 718. For example, a bolt is inserted into the through-hole 723 substantially in the longitudinal center of the rail mount 718, the bolt is fixed to a jig or the like, and a nut is screwed onto the bolt from above. Then, the nut is fastened tightly to press the rail mount 718 from above to impart the downward convex curve D1 to the rail mount 718. It is possible to adjust the amount of the downward convex curve D1 by adjusting the force to fasten the nut to press the rail mount 718 (by adjusting the position of the nut relative to the bolt). That is, the through-hole 723 in the longitudinal center of the rail mount 718 is for use in imparting the downward convex curve D1 to the rail mount 718 and also for use in adjusting the downward convex curve D1.

Figure 15:
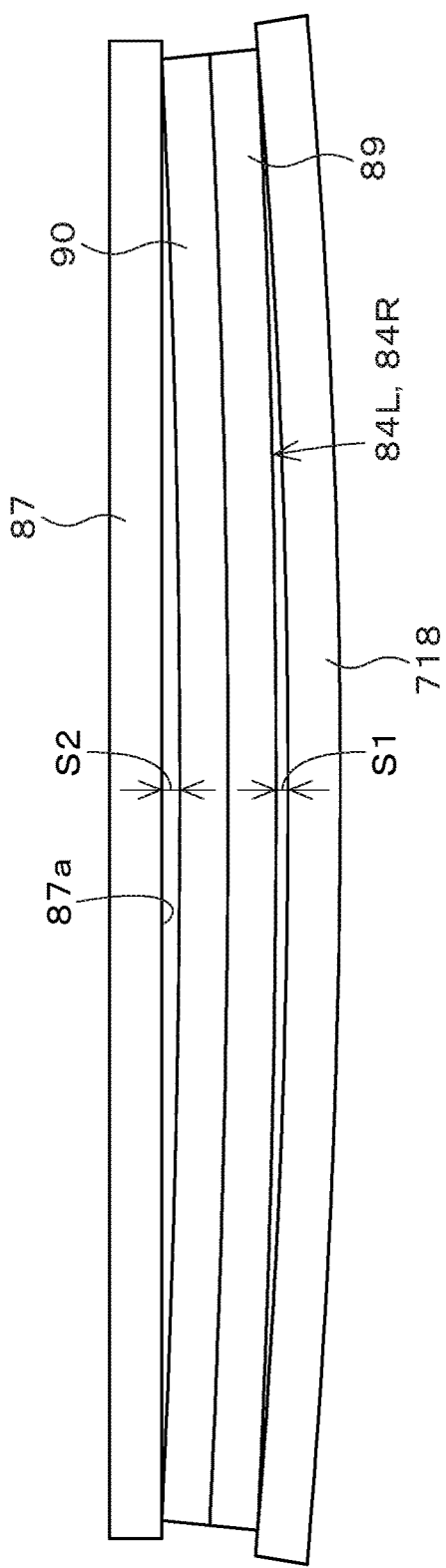
FIG. 15 is a graphical overview of the lower rail segment attached to the rail mount and an upper rail segment attached to the slide frame as seen from side.

FIG. 15 is a graphical overview of the lower rail segment 89 attached to the rail mount 718 and the upper rail segment 90 attached to the slide frame 87 as seen from side.

As illustrated in FIG. 15, since the lower rail segment 89 is fixed to the rail mount 718 with the mounting bolts 722 and the mounting nuts 721, the lower rail segment 89 is bent to form a downward convex curve along the downward convex curve D1. However, since the lower rail segment 89 is fixed to the rail mount 718 at the opposite ends in the longitudinal direction but is not fixed to the rail mount 718 at the center in the longitudinal direction, a gap (first gap) S1 forms between the rail mount 718 and an intermediate portion of the lower rail segment 89 in the longitudinal direction. Furthermore, since the upper rail segment 90 is fixed to the slide frame 87 at the opposite ends in the longitudinal direction but is not fixed to the slide frame 87 at the center in the longitudinal direction, the center of the upper rail segment 90 is bendable to form a downward convex curve. With this, a gap (second gap) S2 forms between the slide frame 87 and an intermediate portion of the upper rail segment 90 in the longitudinal direction.

Figure 16:
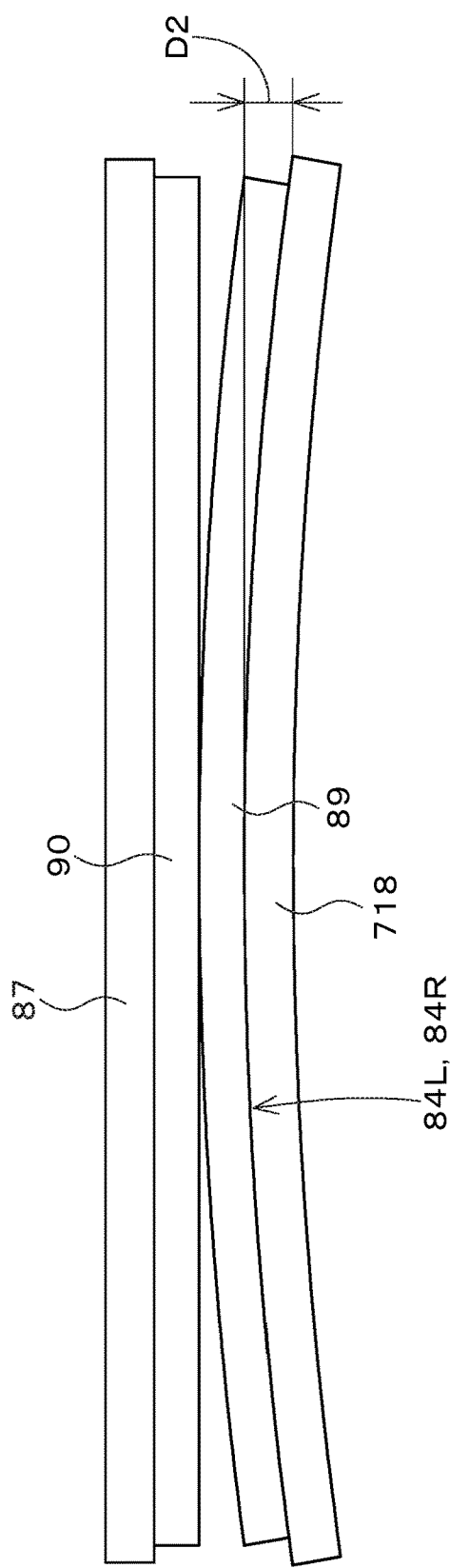
FIG. 16 is a graphical overview of a portion in which the slide rail is attached when the rail mount has an upward convex curve.

It is noted that, as illustrated in FIG. 16, the rail mount 718 (rail mount surface 718*a*) may have an "upward convex curve D2" which is curved upward to form an upward convex shape with increasing distance from each of the opposite ends of the rail mount 718 in the longitudinal direction (longitudinal direction of the first slide rail 84L or the second slide rail 84R) and with decreasing distance to the center of the rail mount 718 in the longitudinal direction, depending on, for example, variations in machining accuracy.

FIG. 16 is a graphical overview of a portion in which the slide rail is attached when the rail mount 718 has the upward convex curve D2.

In such a case, since the lower rail segment 89 is attached to the rail mount 718, the lower rail segment 89 is bent to form an upward convex curve along the upper surface of the rail mount 718. In contrast, since the upper rail segment 90 is attached to the slide frame 87, the upper rail segment 90 is not bendable to form an upward convex curve. In such a case, the following occurs. When the upper rail segment 90 slides relative to the lower rail segment 89 in the front-rear direction and the center of the upper rail segment 90 in the longitudinal direction reaches the center of the lower rail segment 89 in the longitudinal direction, the slide rail is pressed between the peak of the upward convex curve D2 of the rail mount 718 and the slide frame 87, causing high sliding load and preventing smooth sliding. The sliding load is sliding resistance that would occur between the upper rail segment 90 and the lower rail segment 89 when the upper rail segment 90 slides relative to the lower rail segment 89 (slides in the front-rear direction K1).

In contrast, in the present embodiment, there is the first gap S1 between the intermediate portion of each of the slide rails 84L and 84R (lower rail segment 89) in the longitudinal direction thereof and a corresponding rail mount 718, and there is the second gap S2 between the slide frame 87 and the intermediate portion of each of the slide rails 84L and 84R (upper rail segment 90) in the longitudinal direction thereof, making it possible to prevent or reduce the load on each of the slide rails 84L and 84R between the corresponding rail mount 718 and the slide frame 87. This makes it possible to reduce the sliding load on the slide rails 84L and 84R.

For example, when the rail mount 718 has an upward convex curve D2 of about 1 mm, a sliding load (operating load) of about 20 Kgf is applied. However, when the rail mount 718 has a downward convex curve D1 of only about 0.1 mm, the rail segments of the slide rails 84L and 84R slide smoothly under a sliding load (operating load) of about 4 Kgf.

In the present embodiment, it is possible to allow the lower rail segment 89 and the upper rail segment 90 to have the same shape. With this, the sliding load on the slide rails 84L and 84R satisfies requirements.

Note that, in the present embodiment, it is only necessary to provide at least the gap S1 to prevent or reduce the load on the slide rails 84L and 84R between the rail mounts 718 of the seat base 83 and the slide frame 87 which is a rail mount on the operator's seat 6 side.

The sliding load on the slide rails 84L and 84R can be reduced by achieving the flatness of the surfaces for attachment of the slide rails 84L and 84R by milling of the surfaces. This method, however, requires more time and cost. In the present embodiment, the sliding load on the slide rails 84L and 84R can be reduced without having to mill the surfaces for attachment of the slide rails 84L and 84R.

A working machine 1 as has been discussed includes an operator's seat 6, a seat base 83 supporting the operator's seat 6, and a slide rail (a first slide rail 84L and/or a second slide rail 84R) for adjustment of a position of the operator's seat 6, the slide rail 84L, 84R being located between the seat base 83 and the operator's seat 6, and the seat base 83 includes a rail mount 718 for attachment of the slide rail 84L, 84R, the rail mount 718 having a downward convex curve D1 which is curved to deviate from the slide rail 84L, 84R with increasing distance from each of opposite ends of the rail mount 718 in a longitudinal direction of the slide rail 84L, 84R and with decreasing distance to a center of the rail mount 718 in the longitudinal direction.

With the configuration, when the slide rail(s) 84L, 84R is/are attached to the rail mount(s) 718 having the downward convex curve D1, a gap forms between the slide rail(s) 84L, 84R and the rail mount(s) 718. The gap makes it possible, when rail segments of the slide rail(s) 84L, 84R are caused to slide, to prevent or reduce a load applied on the slide rail(s) 84L, 84R between the rail mount(s) 718 of the seat base 83 and rail mount(s) for the operator's seat 6. This makes it possible to reduce the sliding load on the slide rail(s) 84L, 84R.

The slide rail 84L, 84R may include an upper rail segment 90 for direct or indirect attachment to the operator's seat 6 and a lower rail segment 89 for attachment to the rail mount 718. Opposite ends of the lower rail segment 89 in the longitudinal direction may be attached to the rail mount 718, and there may be a first gap S1 between the rail mount 718 and an intermediate portion of the lower rail segment 89 in the longitudinal direction.

With the configuration, the first gap S1 makes it possible to prevent or reduce the load applied on the slide rail(s) 84L, 84R between the rail mount(s) 718 of the seat base 83 and the rail mount(s) for the operator's seat 6.

The working machine 1 may further include a movable body 85 for attachment of the operator's seat 6. Opposite ends of the upper rail segment 90 in the longitudinal direction may be attached to a lower surface 87*a* of the movable body 85, and there may be a second gap S2 between the lower surface 87*a* and an intermediate portion of the upper rail segment 90 in the longitudinal direction.

With the configuration, the gap between the slide rail(s) 84L, 84R and the rail mount(s) 718 and the second gap S2 make it possible to prevent or reduce the load applied on the slide rail(s) 84L, 84R between the rail mount(s) 718 of the seat base 83 and the lower surface 87*a* of the movable body 85.

The seat base 83 may include a top plate 713 having a mounting hole 719. The rail mount 718 may be formed of a thick plate for insertion into the mounting hole 719 such that the thick plate protrudes upward from the top plate 713, and the thick plate having the downward convex curve D1 imparted thereto may be welded to the top plate 713.

With the configuration, a material thicker than the top plate 713 can be used to make the rail mount(s) 718, making it possible to achieve sufficient strength to support heavy objects such as the operator's seat 6 and the movable body 85.

The thick plate of the rail mount 718 may have, in an intermediate portion of the thick plate in the longitudinal direction, a through-hole 723 for adjustment of the downward convex curve D1.

The configuration makes it possible to adjust the amount of the downward convex curve D1.

There may be a plurality of the slide rails including a first slide rail 84L and a second slide rail 84R, the first slide rail 84L being located closer to one of opposite sides of the operator's seat 6 than to the other of the opposite sides of the operator's seat 6, the second slide rail 84R being located closer to the other of the opposite sides of the operator's seat 6 than to the one of the opposite sides of the operator's seat 6 and located substantially in parallel to the first slide rail 84L.

The working machine 1 may further include a movable body 85 supported by the slide rail 84L, 84R such that a position of the movable body 85 relative to the seat base 83 is adjustable, and another slide rail supporting the operator's seat 6 such that the position of the operator's seat 6 relative to the movable body 85 is adjustable.

The configuration makes it possible to reduce the sliding load on the movable body 85 in the operator section 23 which includes the slide rail(s) 84L, 84R for adjustment of the position of the movable body 85 having the operator's seat 6 provided thereon and the other slide rail(s) 86L, 86L for adjustment of the position of the operator's seat 6 relative to the movable body 85.

The working machine 1 may further include a first console 79L located on one of opposite sides of the operator's seat 6 and attached to the movable body 85, and a second console 79R located on the other of the opposite sides of the operator's seat 6 and attached to the movable body 85.

The configuration makes it possible to reduce the sliding load on the movable body 85 having provided thereon the operator's seat 6, the first console 79L, and the second console 79R.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working machine comprising:
    an operator's seat;
    a seat base supporting the operator's seat; and
    a slide rail for adjustment of a position of the operator's seat, the slide rail being located between the seat base and the operator's seat,
    wherein the seat base includes a rail mount for attachment of the slide rail, the rail mount having a downward convex curve which is curved to deviate from the slide rail with increasing distance from each of opposite ends of the rail mount in a longitudinal direction of the slide rail and with decreasing distance to a center of the rail mount in the longitudinal direction.

2. The working machine according to claim 1, wherein:
    the slide rail includes an upper rail segment for direct or indirect attachment to the operator's seat and a lower rail segment for attachment to the rail mount; and
    opposite ends of the lower rail segment in the longitudinal direction are attached to the rail mount, and there is a first gap between the rail mount and an intermediate portion of the lower rail segment in the longitudinal direction.

3. The working machine according to claim 2, further comprising a movable body for attachment of the operator's seat,
    wherein opposite ends of the upper rail segment in the longitudinal direction are attached to a lower surface of the movable body, and there is a second gap between the lower surface and an intermediate portion of the upper rail segment in the longitudinal direction.

4. The working machine according to claim 1, wherein:
    the seat base includes a top plate having a mounting hole; and
    the rail mount is formed of a thick plate for insertion into the mounting hole such that the thick plate protrudes upward from the top plate, and the thick plate having the downward convex curve imparted thereto is welded to the top plate.

5. The working machine according to claim 4, wherein the thick plate of the rail mount has, in an intermediate portion of the thick plate in the longitudinal direction, a through-hole for adjustment of the downward convex curve.

6. The working machine according to claim 1, wherein there are a plurality of the slide rails including a first slide rail and a second slide rail, the first slide rail being located closer to one of opposite sides of the operator's seat than to the other of the opposite sides of the operator's seat, the second slide rail being located closer to the other of the opposite sides of the operator's seat than to the one of the opposite sides of the operator's seat and located substantially in parallel to the first slide rail.

7. The working machine according to claim 1, further comprising:
    a movable body supported by the slide rail such that a position of the movable body relative to the seat base is adjustable; and
    another slide rail supporting the operator's seat such that the position of the operator's seat relative to the movable body is adjustable.

8. The working machine according to claim 7, further comprising:
    a first console located on one of opposite sides of the operator's seat and attached to the movable body; and
    a second console located on the other of the opposite sides of the operator's seat and attached to the movable body.

* * * * *